(12) United States Patent
Mishra

(10) Patent No.: US 12,258,038 B1
(45) Date of Patent: Mar. 25, 2025

(54) ROAD USER IDENTIFICATION SYSTEM FOR IDENTIFYING A ROAD USER FOR SAFER AUTONOMOUS VEHICLE ROAD NAVIGATION

(71) Applicant: Viveka Mishra, Detroit, MI (US)

(72) Inventor: Viveka Mishra, Detroit, MI (US)

( * ) Notice: Subject to any disclaimer, the term of this patent is extended or adjusted under 35 U.S.C. 154(b) by 235 days.

(21) Appl. No.: 17/582,134

(22) Filed: Jan. 24, 2022

Related U.S. Application Data

(60) Provisional application No. 63/140,871, filed on Jan. 24, 2021.

(51) Int. Cl.
| | | |
|---|---|---|
| *B60W 60/00* | (2020.01) | |
| *B60W 30/09* | (2012.01) | |
| *B60W 30/095* | (2012.01) | |
| *G01S 13/931* | (2020.01) | |
| *G01S 17/931* | (2020.01) | |
| *G06V 10/82* | (2022.01) | |
| *G06V 20/58* | (2022.01) | |

(52) U.S. Cl.
CPC ........ *B60W 60/0011* (2020.02); *B60W 30/09* (2013.01); *B60W 30/0956* (2013.01); *B60W 60/0015* (2020.02); *B60W 60/00274* (2020.02); *G01S 13/931* (2013.01); *G01S 17/931* (2020.01); *G06V 10/82* (2022.01); *G06V 20/58* (2022.01); *B60W 2420/408* (2024.01); *B60W 2554/402* (2020.02); *B60W 2554/4041* (2020.02); *B60W 2554/4045* (2020.02)

(58) Field of Classification Search
CPC ......... B60W 60/0011; B60W 60/0015; B60W 60/00274; B60W 30/09; B60W 30/0956; B60W 2554/402; B60W 2554/4041; B60W 2554/4045; B60W 2420/408; G01S 17/931; G01S 13/931; G06V 20/58; G06V 10/82
See application file for complete search history.

(56) References Cited

U.S. PATENT DOCUMENTS

| | | | |
|---|---|---|---|
| 2013/0051624 A1* | 2/2013 | Iwasaki | G06V 10/255 382/103 |
| 2017/0349169 A1* | 12/2017 | Deshpande | B60W 10/18 |
| 2019/0259284 A1* | 8/2019 | Khadloya | G06V 10/25 |
| 2021/0183249 A1* | 6/2021 | Beauchamp | G08G 1/163 |

* cited by examiner

*Primary Examiner* — Tyler J Lee
*Assistant Examiner* — Yufeng Zhang
(74) *Attorney, Agent, or Firm* — Reising Ethington P.C.

(57) ABSTRACT

A road user identification system for identifying a road user is provided. The system includes a digital camera generating a digital image of a road with the road user on the road. The system further includes a computer operably coupled to the digital camera that receives the digital image. The computer has a digital image based classification model with a neural network machine learning algorithm that analyzes the digital image and determines a first probability value. The first probability value indicates a probability that the road user has a first wearable marker that is associated with a specific type of road user. The computer stores a road user identifier corresponding to the specific type of road user in a memory device when the first probability value is greater than a threshold probability value.

15 Claims, 7 Drawing Sheets

ROAD USER IDENTIFICATION SYSTEM FOR IDENTIFYING A ROAD USER FOR SAFER AUTONOMOUS VEHICLE ROAD NAVIGATION

CROSS-REFERENCE TO RELATED APPLICATION

This application claims priority to U.S. Provisional Patent Application No. 63/140,871 filed on Jan. 24, 2021, the entire contents of which are hereby incorporated by reference herein.

BACKGROUND

Driver assistance and autonomous vehicle systems have been developed to prevent or mitigate collisions between vehicles and road users such as pedestrians and cyclists. However, these systems face challenges with respect to a detection accuracy of road users and a confidence in the detection of road users which can slow down the response time of these systems.

The inventor herein has recognized that it would be advantageous to provide an improved road user identification system that is configured to detect wearable markers to quickly identify types of road users to improve the detection response time of a road user, and the overall vehicle movement response time to safely navigate around and to not contact the road user.

SUMMARY

A road user identification system for identifying a road user for safer autonomous road navigation in accordance with an exemplary embodiment is provided. The road user identification system includes a digital camera generating a digital image of a road with the road user on the road. The road user identification system further includes a computer operably coupled to the digital camera that receives the digital image. The computer has a digital image based classification model with a neural network machine learning algorithm that analyzes the digital image and determines a first probability value. The first probability value indicates a probability that the road user has a first wearable marker that is associated with a specific type of road user. The computer stores a road user identifier corresponding to the specific type of road user in a memory device when the first probability value is greater than a threshold probability value.

A road user identification system for identifying a road user for safer autonomous road navigation in accordance with another exemplary embodiment is provided. The road user identification system includes a radar system generating radar reflection data representative of a road with the road user on the road. The road user identification system further includes a computer operably coupled to the radar system that receives the radar reflection data. The computer has a radar reflection data based classification model with a neural network machine learning algorithm that analyzes the radar reflection data and determines a first probability value. The first probability value indicates a probability that the road user has a first wearable marker that is associated with a specific type of road user. The computer stores a road user identifier corresponding to the specific type of road user in a memory device when the first probability value is greater than a threshold probability value.

A road user identification system for identifying a road user for safer autonomous road navigation in accordance with another exemplary embodiment is provided. The road user identification system includes a lidar system generating lidar reflection data representative of a road with the road user on the road. The road user identification system further includes a computer operably coupled to the lidar system that receives the lidar reflection data. The computer has a lidar reflection data based classification model with a neural network machine learning algorithm that analyzes the lidar reflection data and determines a first probability value. The first probability value indicates a probability that the road user has a first wearable marker that is associated with a specific type of road user. The computer stores a road user identifier corresponding to the specific type of road user in a memory device when the first probability value is greater than a threshold probability value.

DETAILED DESCRIPTION

Figure 1:
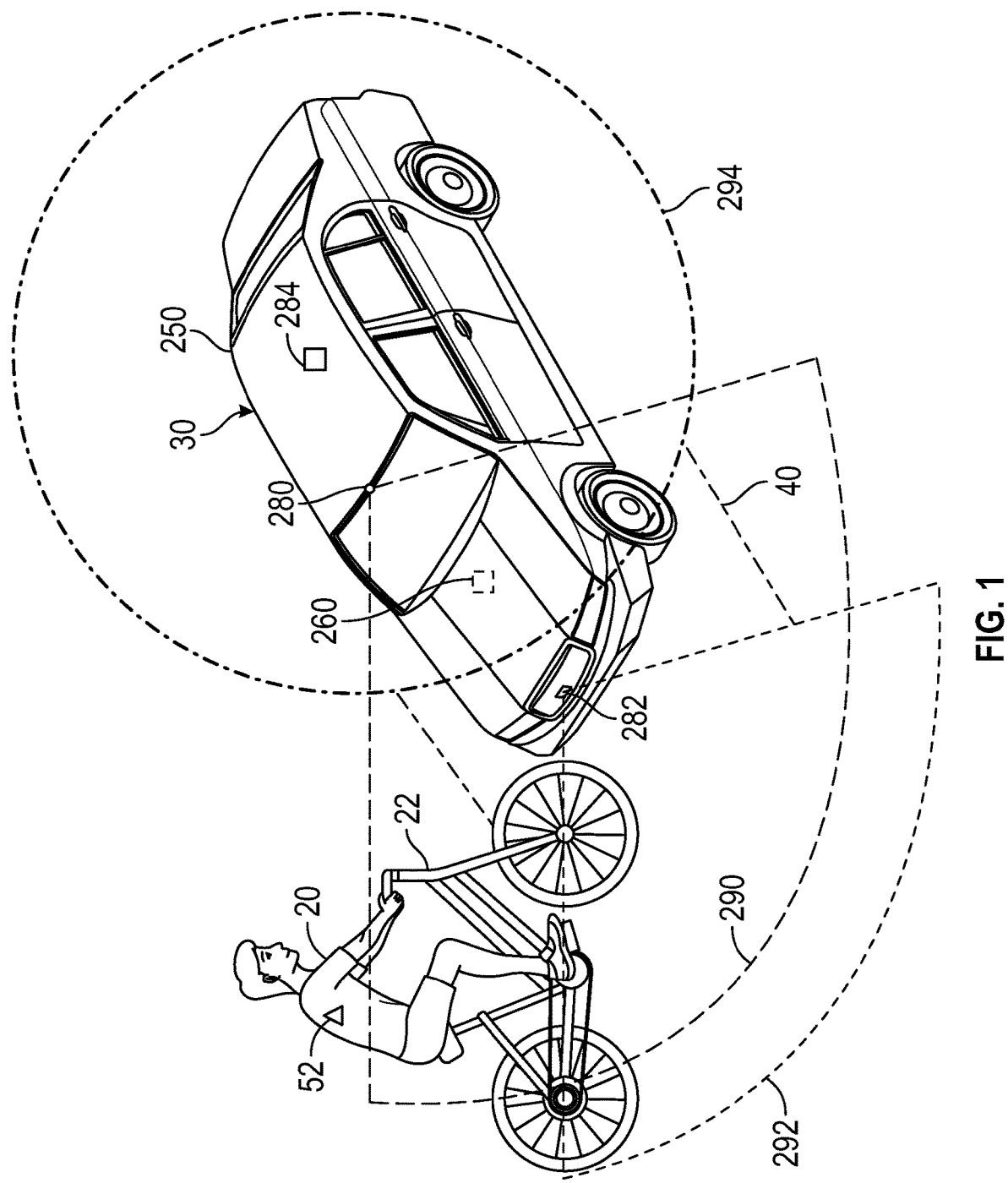
FIG. 1 is an isometric view of a vehicle having a road user identification system in accordance with an exemplary embodiment that identifies a road user.
Figure 2:
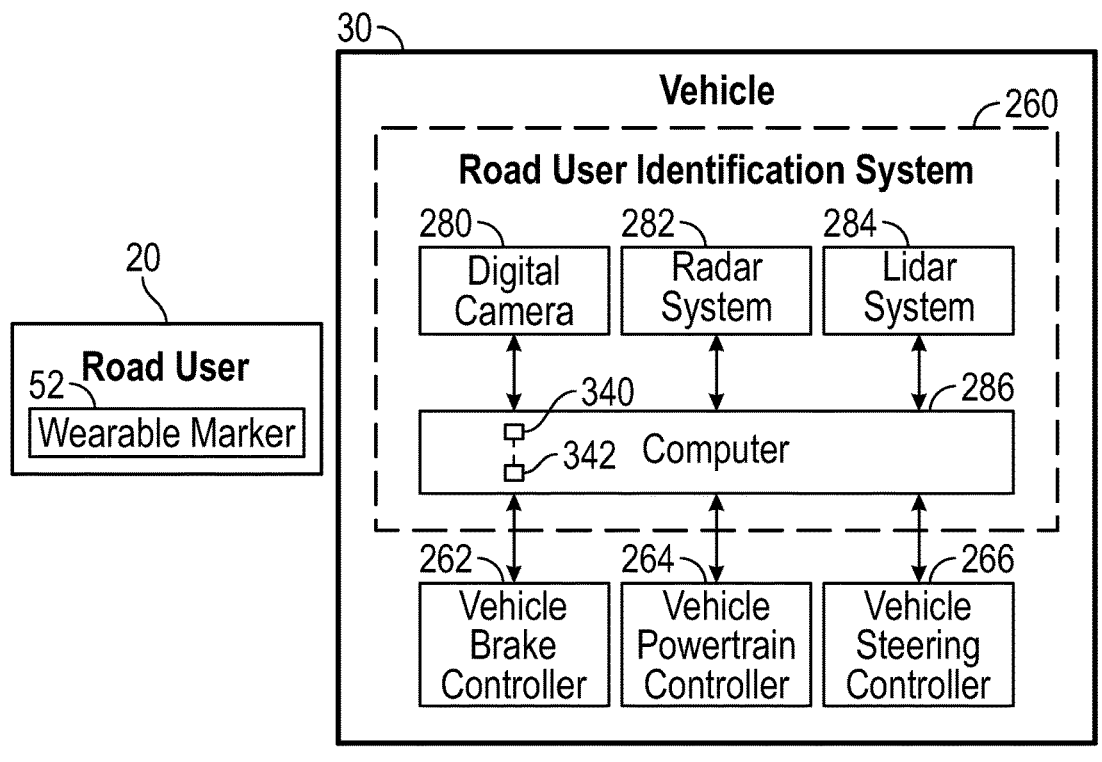
FIG. 2 is a block diagram of the road user and the vehicle of FIG. 1.

Referring to FIGS. 1 and 2, a vehicle 30 that identifies and avoids a road user 20 on a road in accordance with an exemplary embodiment is illustrated. As shown, the road user 20 is a cyclist riding a bicycle 22 on the road 40.

For purposes of understanding, a few terms will be defined hereinafter.

The term "road user" means a human or an animal that is on a road and is not enclosed within a vehicle.

The term "wearable marker" means a predetermined marker that is placed on or in an article of clothing with specific detection properties that indicates a specific type of road user. In particular, a wearable marker can identify at least one of the following types of road users: a cyclist, an adult, a child, a senior citizen for example. It is noted that the wearable marker is distinct from the article of clothing even though it is attached or fixedly coupled to the clothing. Further, each type of wearable marker has a distinct detection signature and may have a distinct shape or a distinct reflection characteristic. In an exemplary embodiment, the wearable marker can be detected utilizing at least one of a digital camera 280, a radar system 282, or a lidar system 284.

Figure 4:
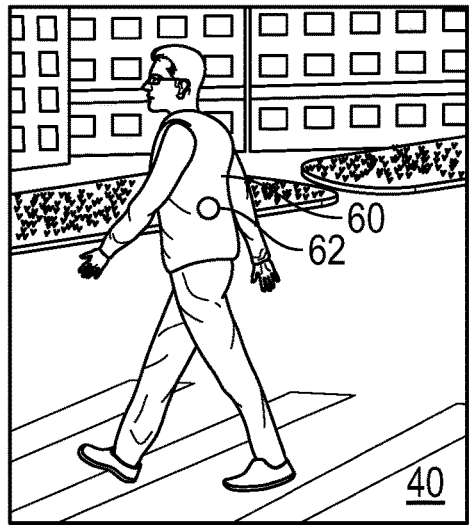
FIG. 4 is a schematic of a road user corresponding to a senior citizen having a wearable marker thereon that identifies a senior citizen.
Figure 5:
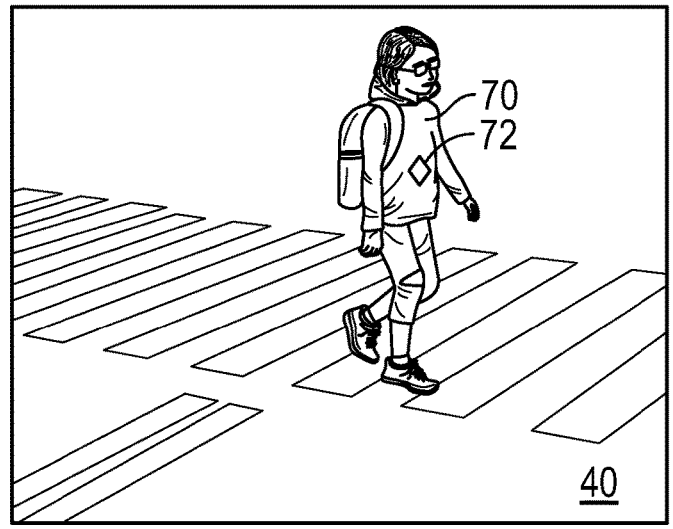
FIG. 5 is a schematic of a road user corresponding to a child having a wearable marker thereon that identifies a child.
Figure 6:
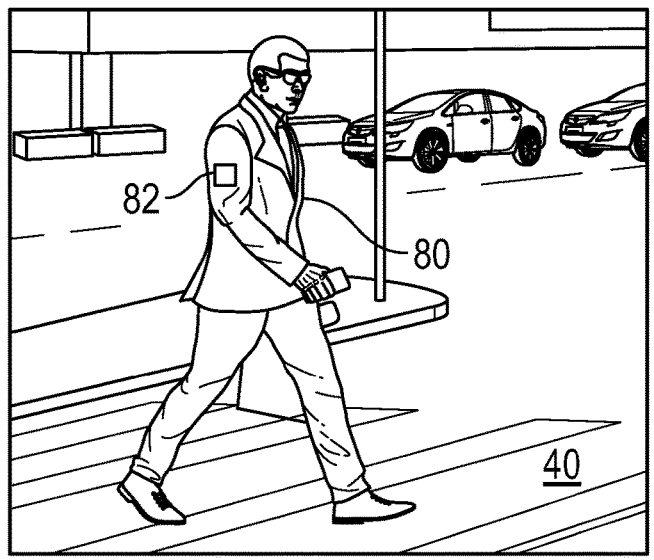
FIG. 6 is a schematic of a road user corresponding to an adult having a wearable marker thereon that identifies an adult.
Figure 7:
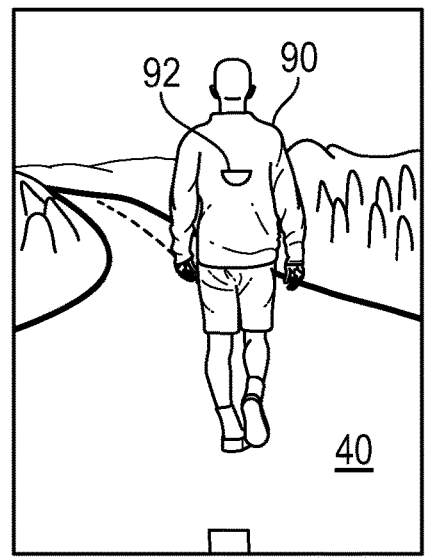
FIG. 7 is a schematic of a road user corresponding to a pedestrian having a wearable marker thereon that identifies a pedestrian.
Figure 8:
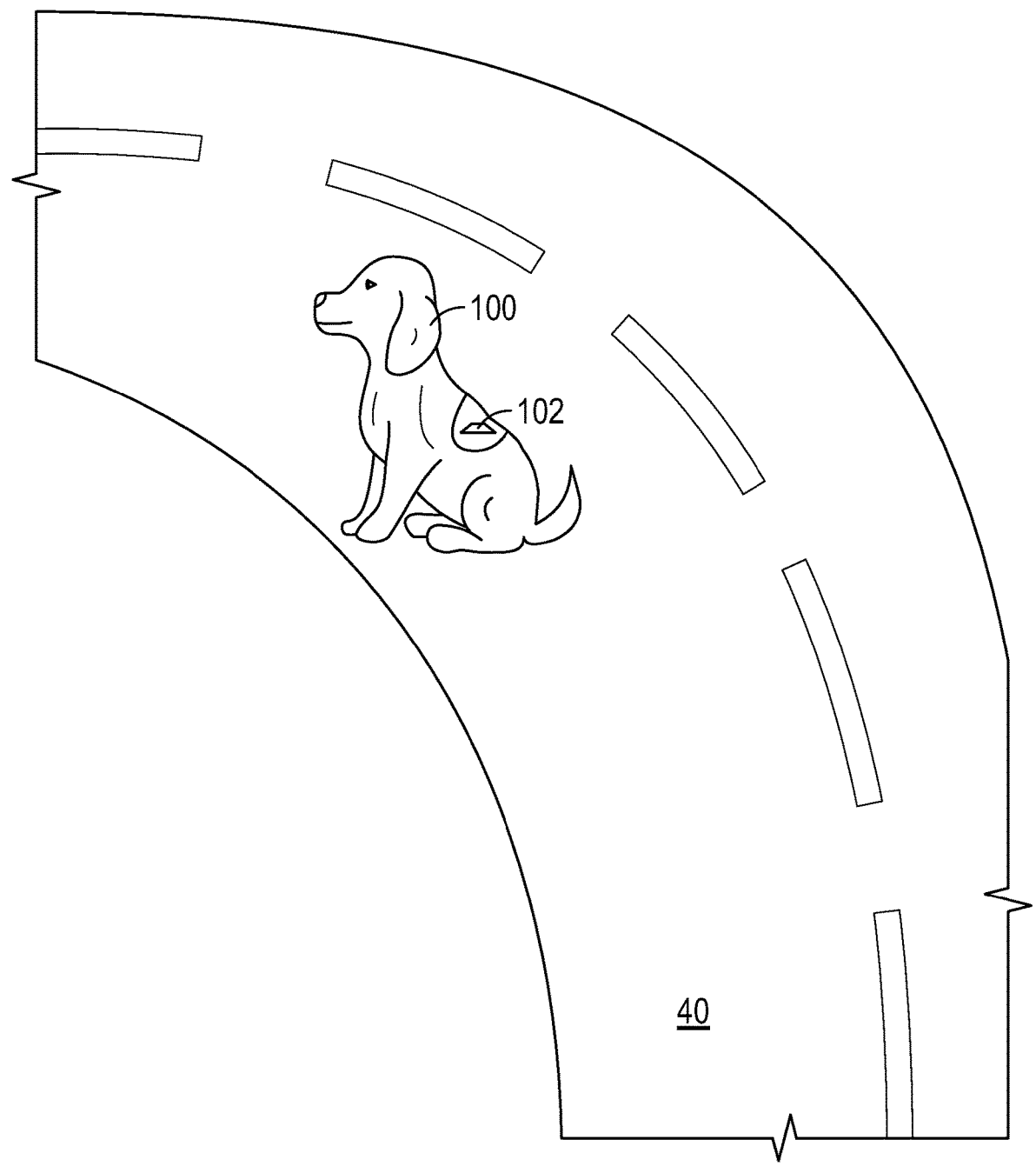
FIG. 8 is a schematic of a road user corresponding to an animal having a wearable marker thereon that identifies an animal.
Figure 9:
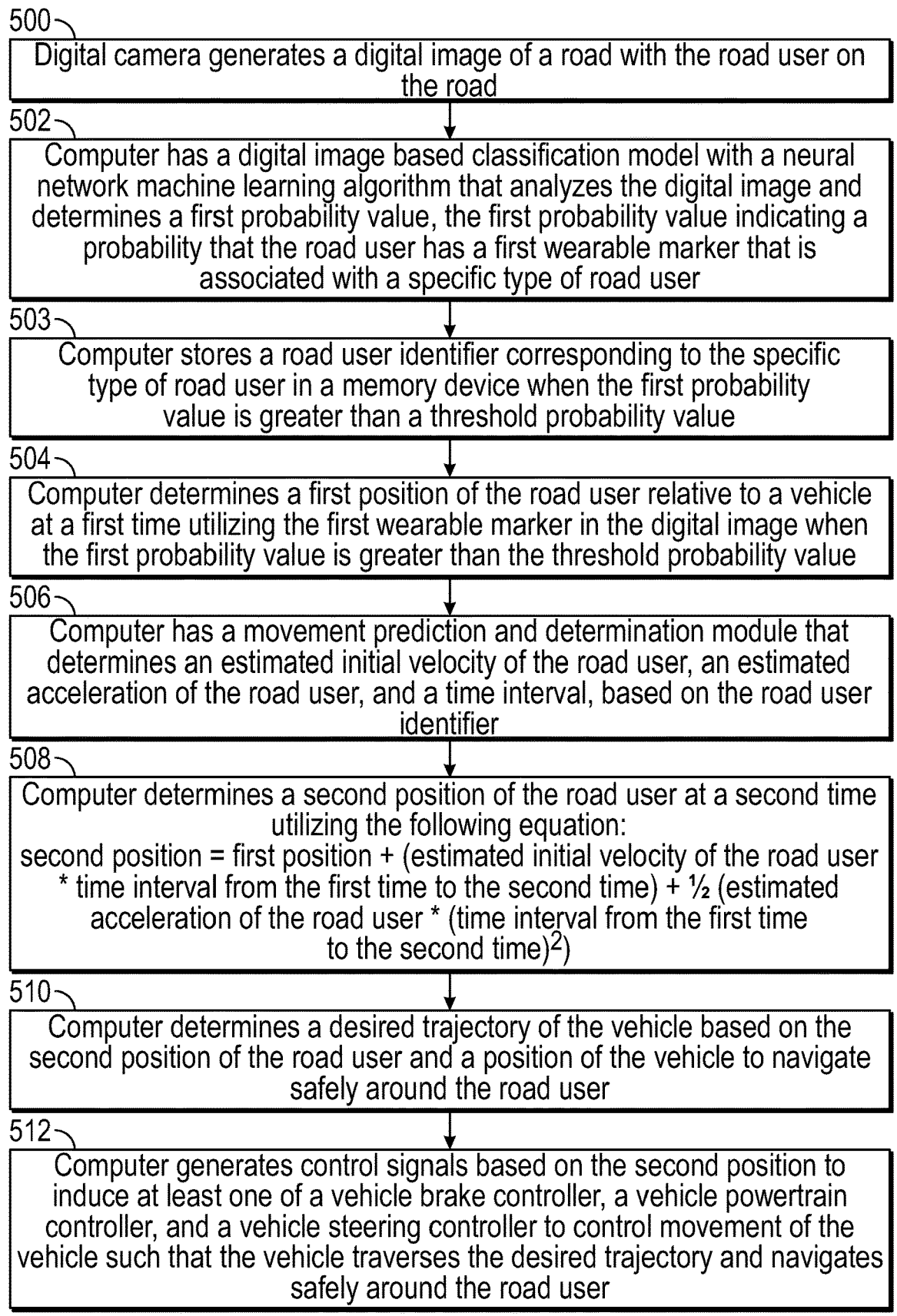
FIG. 9 is a flowchart of a method for identifying a road user utilizing a digital camera in the road user identification system of FIG. 1.
Figure 10:
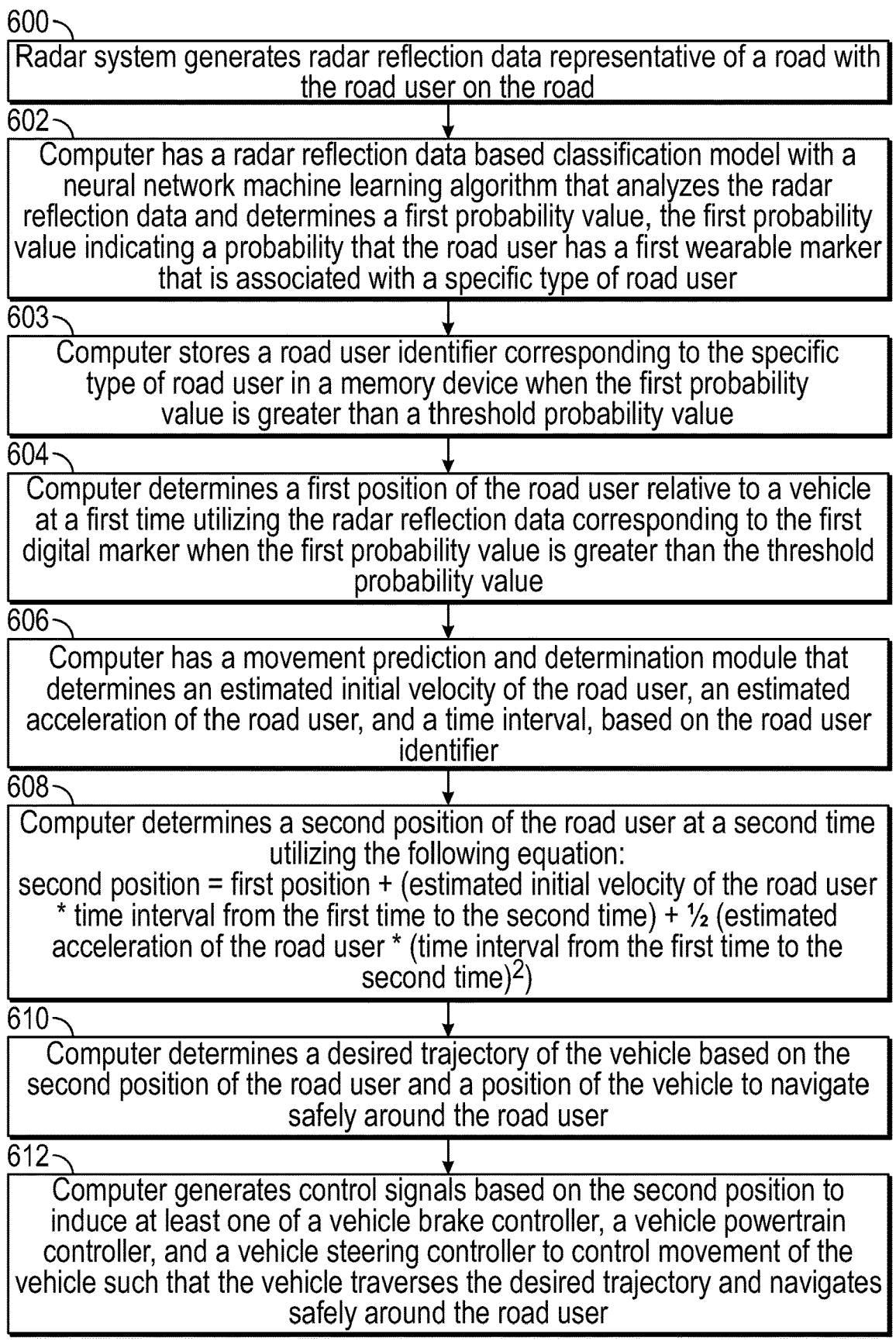
FIG. 10 is a flowchart of a method for identifying a road user utilizing a radar system in the road user identification system of FIG. 1.
Figure 11:
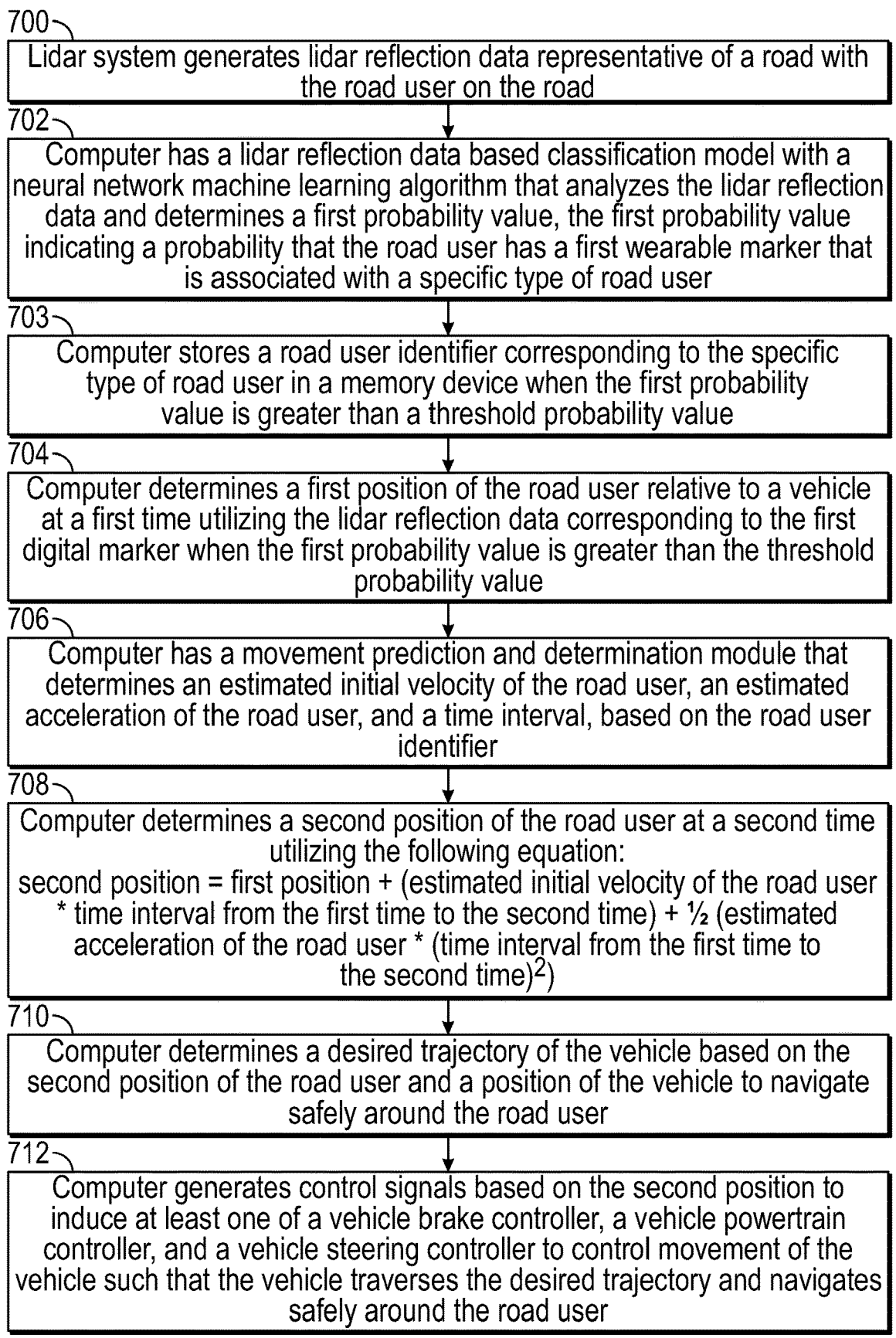
FIG. 11 is a flowchart of a method for identifying a road user utilizing a lidar system in the road user identification system of FIG. 1.

Referring to FIG. 1, the road user 20 is wearing a wearable marker 52 that indicates a cyclist. Referring to FIG. 4, the road user 60 is wearing a wearable marker 62 that indicates a senior citizen. Referring to FIG. 5, the road user 70 is wearing a wearable marker 72 that indicates a child. Referring to FIG. 6, the road user 80 is wearing a wearable marker 82 that indicates an adult. Referring to FIG. 7, the road user 90 is wearing a wearable marker 92 that indicates a pedestrian. Referring to FIG. 8, the road user 100 is wearing a wearable marker 102 that indicates an animal.

The inventor herein has recognized that a wearable marker allows the road user identification system 260 in the vehicle 30 to more quickly identify a specific type of road user and to control movement of the vehicle 30 to avoid contacting the road user. Further, the system 260 can determine an estimated initial velocity of the road user, an estimated acceleration of the road user, and a time interval based on the road user identifier. For example, a cyclist will have an estimated initial velocity that is greater than an estimated initial velocity of a pedestrian, and an estimated acceleration that is greater than an estimated acceleration of the pedestrian. Further, because the cyclist is likely moving faster than the pedestrian, the time interval associated with the cyclist could be more than a time interval associated with a pedestrian to model a more imminent path intersection.

Referring to FIGS. 1 and 2, the vehicle 30 includes a vehicle body 250, a road user identification system 260, a vehicle brake controller 262, a vehicle powertrain controller 264, and a vehicle steering controller 266.

The road user identification system 260 is disposed within the vehicle body 250 and is provided to control movement of the vehicle 30 such that the vehicle 30 navigates safely around and does not contact a road user. The road user identification system 260 includes a digital camera 280, a radar system 282, a lidar system 284, and a computer 286.

The digital camera 280 is coupled to the vehicle body 250. The digital camera 280 is provided to receive light reflected off of the road 40 and objects thereon and to generate a plurality of digital images of the road 40 and objects thereon utilizing the reflected light. Further, the digital camera 280 sends the plurality of digital images to the computer 286. In an exemplary embodiment, the digital camera 280 has a detection range 290 in front of the vehicle 30.

The radar system 282 is coupled to the vehicle body 250. The radar system 282 is provided to generate radio wave pulses and to generate radar reflection data representative of the road 40 and objects thereon from the radio wave pulses being reflected off of the road and objects and back to the radar system 282. Further, the radar system 282 sends the radar reflection data to the computer 286. In an exemplary embodiment, the radar system 282 has a detection range 292 in front of the vehicle 30.

The lidar system 284 is coupled to the vehicle body 250. The lidar system 284 is provided to generate laser beam pulses and to further generate lidar reflection data representative of the road 40 and objects thereon from the laser beam pulses being reflected off of the road and objects and back to the lidar system 282. Further, the lidar system 284 sends the lidar reflection data to the computer 286. In an exemplary embodiment, the lidar system 284 has a detection range 294 around the vehicle 30.

Figure 3:
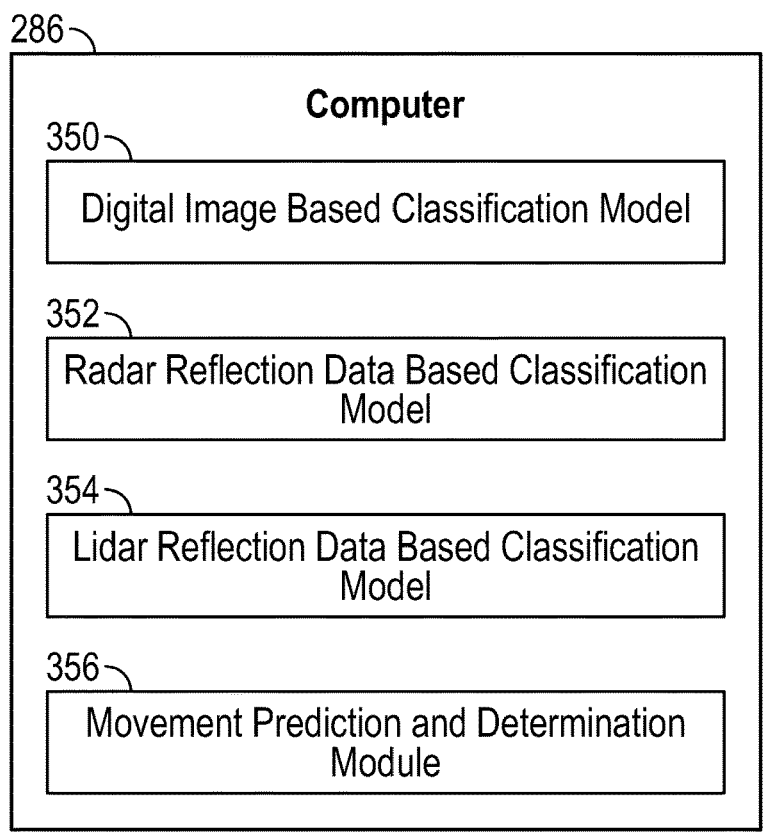
FIG. 3 is a block diagram of a computer utilized in the road user identification system of FIG. 1.

Referring to FIGS. 2 and 3, the computer 286 is provided to control the operation of the vehicle 30 and to implement the methods described herein. In particular, the computer 286 sends and receives data from the digital camera 280, the radar system 282, and the lidar system 284. Also, the computer 286 generates control signals that are received by the vehicle brake controller 262, the vehicle powertrain controller 264, and the vehicle steering controller 266. As shown, the computer 286 is operably coupled the digital camera 280, the radar system 282, and the lidar system 284, the vehicle brake controller 262, the vehicle powertrain controller 264, and the vehicle steering controller 266. The computer 286 includes a microprocessor 340 operably communicating with a memory 342. The microprocessor 340 implements the methods performed by the computer 286, and the memory 342 stores data utilized in the methods described herein. Further, the memory 342 stores a digital image based classification model 350, a radar reflection data based classification model 352, a lidar reflection data based classification model 354, and a movement prediction and determination module 356.

The digital image based classification model 350 has a neural network machine learning algorithm that analyzes a digital image and determines a first probability value. The first probability value indicates a probability that a road user has a wearable marker that is associated with a specific type of road user (e.g., a cyclist, an adult, a child, or a senior citizen). The digital image based classification model 350 is initially trained using: (i) a plurality of images of road users wearing a specific wearable marker, and (ii) respective tags indicating the type of road user. Although only one digital image based classification model has been illustrated herein for purposes of simplicity, it is noted that in an alternative embodiment, there could be a distinct digital image based classification model for identifying each type of road user (e.g., a cyclist, an adult, a child, or a senior citizen).

The radar reflection data based classification model 352 has a neural network machine learning algorithm that analyzes radar reflection data and determines a first probability value. The first probability value indicates a probability that a road user has a wearable marker that is associated with a specific type of road user (e.g., a cyclist, an adult, a child, or a senior citizen). The radar reflection data based classification model 352 is initially trained using: (i) a plurality of radar reflection data of road users wearing a specific wearable marker, and (ii) respective tags indicating the type of road user. Although only one radar reflection data based classification model has been illustrated herein for purposes of simplicity, it is noted that in an alternative embodiment, there could be a distinct radar reflection data based classification model for identifying each type of road user (e.g., a cyclist, an adult, a child, or a senior citizen).

The lidar reflection data based classification model 354 has a neural network machine learning algorithm that analyzes lidar reflection data and determines a first probability value. The first probability value indicates a probability that a road user has a wearable marker that is associated with a specific type of road user (e.g., a cyclist, an adult, a child, or a senior citizen). The lidar reflection data based classification model 354 is initially trained using: (i) a plurality of lidar reflection data of road users wearing a specific wearable marker, and (ii) respective tags indicating the type of road user. Although only one lidar reflection data based classification model has been illustrated herein for purposes of simplicity, it is noted that in an alternative embodiment, there could be a distinct lidar reflection data based classification model for identifying each type of road user (e.g., a cyclist, an adult, a child, or a senior citizen).

Referring to FIG. 1, the vehicle brake controller 262 is disposed within the vehicle 30 and is provided to control a brake system of the vehicle 30 in response to control signals from the computer 286. As shown, the vehicle brake controller 262 is operably coupled to the computer 286.

The vehicle powertrain controller 264 is disposed within the vehicle 30 and is provided to control a powertrain of the vehicle 30 in response to control signals from the computer 286. As shown, the vehicle powertrain controller 264 is operably coupled to the computer 286.

The vehicle steering controller 266 is disposed within the vehicle 30 and is provided to control a steering system of the vehicle 30 in response to control signals from the computer 286. As shown, the vehicle steering controller 266 is operably coupled to the computer 286.

Referring to FIGS. 1-3 and 9, a flowchart of a method for identifying and avoiding a road user utilizing the road user identification system 260 with the digital camera 280 in accordance with another exemplary embodiment will be explained.

At step 500, a digital camera 280 generates a digital image of a road 40 with the road user 20 on the road 40. After step 500, the method advances to step 502.

At step 502, a computer 286 has a digital image based classification model 350 with a neural network machine learning algorithm that analyzes the digital image and determines a first probability value. The first probability value indicates a probability that the road user 20 has a first wearable marker 52 that is associated with a specific type of road user (e.g., a cyclist). After step 502, the method advances to step 503.

At step 503, the computer 286 stores a road user identifier corresponding to the specific type of road user in a memory device 342 when the first probability value is greater than a threshold probability value. After step 503, the method advances to step 504.

At step 504, the computer 286 determines a first position of the road user 20 relative to a vehicle 30 at a first time utilizing the first wearable marker 52 in the digital image when the first probability value is greater than a threshold probability value. After step 504, the method advances to step 506.

At step 506, the computer 286 has a movement prediction and determination module 356 that determines an estimated initial velocity of the road user, an estimated acceleration of the road user, and a time interval, based on the road user identifier. In an exemplary embodiment, the movement prediction and determination module 356 utilizes a table having a plurality of records that are indexed by the type of road user, and each record has an estimated initial velocity value, an estimated acceleration value, and a time interval value. The module 356 accesses the table utilizing the type of road user as an index, and retrieves the associated estimated initial velocity value, estimated acceleration value, and time interval value from a specific record in the table. After step 506, the method advances to step 508.

At step 508, the computer 286 determines a second position of the road user 20 at a second time utilizing the following equation: second position=first position+(estimated initial velocity of the road user*time interval from the first time to the second time)+½ (estimated acceleration of the road user*(time interval from the first time to the second time)$^2$). After step 508, the method advances to step 510.

At step 510, the computer 286 determines a desired trajectory of the vehicle 30 based on the second position of the road user 20 and a position of the vehicle 30 to navigate safely around the road user 20. After step 510, the method advances to step 512.

At step 512, the computer 286 generates control signals based on the second position to induce at least one of a vehicle brake controller 262, a vehicle powertrain controller 264, and a vehicle steering controller 266 to control movement of the vehicle 30 such that the vehicle 30 traverses the desired trajectory and navigates safely around the road user 20.

Referring to FIGS. 1-3 and 10, a flowchart of a method for identifying and avoiding a road user utilizing the road user identification system 260 with the radar system 282 in accordance with another exemplary embodiment will be explained.

At step 600, the radar system 282 generates radar reflection data representative of a road 40 with the road user 20 on the road 40. After step 600, the method advances to step 602.

At step 602, the computer 286 has a radar reflection data based classification model 352 with a neural network machine learning algorithm that analyzes the radar reflection data and determines a first probability value. The first probability value indicates a probability that the road user 20 has a first wearable marker 52 that is associated with a specific type of road user 20 (e.g., a cyclist). After step 602, the method advances to step 604.

At step 603, the computer 286 stores a road user identifier corresponding to the specific type of road user in a memory device 342 when the first probability value is greater than a threshold probability value. After step 603, the method advances to step 604.

At step 604, the computer 286 determines a first position of the road user 20 relative to a vehicle 30 at a first time utilizing the radar reflection data corresponding to the first digital marker 52 when the first probability value is greater than a threshold probability value. After step 604, the method advances to step 606.

At step 606, the computer 286 has a movement prediction and determination module 356 that determines an estimated initial velocity of the road user 20, an estimated acceleration of the road user 20, and a time interval, based on the road user identifier 20. After step 606, the method advances to step 608.

At step 608, the computer 286 determines a second position of the road user 20 at a second time utilizing the following equation: second position=first position+(estimated initial velocity of the road user 20*time interval from the first time to the second time)+½ (estimated acceleration of the road user 20*(time interval from the first time to the second time)$^2$). After step 608, the method advances to step 610.

At step 610, the computer 286 determines a desired trajectory of the vehicle 30 based on the second position of the road user 20 and a position of the vehicle 30 to navigate safely around the road user 20. After step 610, the method advances step 612.

At step 612, the computer 286 generates control signals based on the second position to induce at least one of a vehicle brake controller 262, a vehicle powertrain controller 264, and a vehicle steering controller 266 to control movement of the vehicle 30 such that the vehicle 30 traverses the desired trajectory and navigates safely around the road user 20.

Referring to FIGS. 1-3 and 11, a flowchart of a method for identifying and avoiding a road user utilizing the road user identification system 260 with the lidar system 284 in accordance with another exemplary embodiment will be explained.

At step 700, the lidar system 284 generates lidar reflection data representative of a road 40 with the road user 20 on the road 40. After step 700, the method advances to step 702.

At step 702, the computer 286 has a lidar reflection data based classification model 354 with a neural network machine learning algorithm that analyzes the lidar reflection data and determines a first probability value. The first probability value indicates a probability that the road user 20 has a first wearable marker 52 that is associated with a specific type of road user 20 (e.g., a cyclist). After step 702, the method advances to step 703.

At step 703, the computer 286 stores a road user identifier corresponding to the specific type of road user in a memory device 342 when the first probability value is greater than a threshold probability value. After step 703, the method advances to step 704.

At step 704, the computer 286 determines a first position of the road user 20 relative to a vehicle 30 at a first time utilizing the lidar reflection data corresponding to the first digital marker 52 when the first probability value is greater than a threshold probability value. After step 704, the method advances to step 706.

At step 706, the computer 286 has a movement prediction and determination module 356 that determines an estimated initial velocity of the road user 20, an estimated acceleration of the road user 20, and a time interval, based on the road user identifier 20. After step 706, the method advances to step 708.

At step 708, the computer 286 determines a second position of the road user 20 at a second time utilizing the following equation: second position=first position+(estimated initial velocity of the road user*time interval from the first time to the second time)+½ (estimated acceleration of the road user*(time interval from the first time to the second time)²). After step 708, the method advances to step 710.

At step 710, the computer 286 determines a desired trajectory of the vehicle 30 based on the second position of the road user 20 and a position of the vehicle 30 to navigate safely around the road user 20. After step 710, the method advances to step 712.

At step 712, the computer 286 generates control signals based on the second position to induce at least one of a vehicle brake controller 262, a vehicle powertrain controller 264, and a vehicle steering controller 266 to control movement of the vehicle 30 such that the vehicle 30 traverses the desired trajectory and navigates safely around the road user 20.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A road user identification system for identifying a road user for safer autonomous road navigation, comprising:
a digital camera generating a digital image of a road with the road user on the road;
a computer operably coupled to the digital camera that receives the digital image;
the computer having a digital image based classification model with a neural network machine learning algorithm that analyzes the digital image and determines a first probability value, the first probability value indicating a probability that the road user has a first wearable marker having a distinct shape that is associated with a specific type of road user, the first wearable marker being placed on or in an article of clothing of the road user;
the computer storing a road user identifier corresponding to the specific type of road user in a memory device when the first probability value is greater than a threshold probability value; and
the computer determining a first position of the road user relative to a vehicle at a first time utilizing the first digital marker in the digital image when the first probability value is greater than the threshold probability value.

2. The road user identification system of claim 1, wherein:
the specific type of road user is at least one of a pedestrian, a cyclist, an adult, a child, a senior citizen, and an animal.

3. The road user identification system of claim 1, wherein:
the computer determining a second position of the road user at a second time based on the first position, an estimated initial velocity of the road user, an estimated acceleration of the road user, and a time interval from the first time to the second time; the second time being after the first time; the estimated initial velocity of the road user, the estimated acceleration of the road user, and the time interval being determined based on the road user identifier; and
the computer generating control signals based on the second position to induce at least one of a vehicle brake controller, a vehicle powertrain controller, and a vehicle steering controller to control movement of the vehicle such that the vehicle navigates safely around and does not contact the road user.

4. The road user identification system of claim 3, wherein:
the computer having a movement prediction and determination module that determines the estimated initial velocity of the road user, the estimated acceleration of the road user, and the time interval, based on the road user identifier.

5. The road user identification system of claim 3, wherein:
the computer determining a desired trajectory of the vehicle based on the second position of the road user and a position of the vehicle to navigate safely around the road user.

6. A road user identification system for identifying a road user for safer autonomous road navigation, comprising:
a radar system generating radar reflection data representative of a road with the road user on the road;
a computer operably coupled to the radar system that receives the radar reflection data;
the computer having a radar reflection data based classification model with a neural network machine learning algorithm that analyzes the radar reflection data and determines a first probability value, the first probability value indicating a probability that the road user has a first wearable marker having a distinct reflection characteristic that is associated with a specific type of road user, the first wearable marker being placed on or in an article of clothing of the road user;

the computer storing a road user identifier corresponding to the specific type of road user in a memory device when the first probability value is greater than a threshold probability value; and the computer determining a first position of the road user relative to a vehicle at a first time utilizing the radar reflection data corresponding to the first digital marker when the first probability value is greater than the threshold probability value.

7. The road user identification system of claim 6, wherein:
the specific type of road user is at least one of a pedestrian, a cyclist, an adult, a child, a senior citizen, and an animal.

8. The road user identification system of claim 6, wherein:
the computer determining a second position of the road user at a second time based on the first position, an estimated initial velocity of the road user, an estimated acceleration of the road user, and a time interval from the first time to the second time; the second time being after the first time; the estimated initial velocity of the road user, the estimated acceleration of the road user, and the time interval being determined based on the road user identifier; and the computer generating control signals based on the second position to induce at least one of a vehicle brake controller, a vehicle powertrain controller, and a vehicle steering controller to control movement of the vehicle such that the vehicle navigates safely around and does not contact the road user.

9. The road user identification system of claim 8, wherein:
the computer having a movement prediction and determination module that determines the estimated initial velocity of the road user, the estimated acceleration of the road user, and the time interval, based on the road user identifier.

10. The road user identification system of claim 8, wherein:
the computer determining a desired trajectory of the vehicle based on the second position of the road user and a position of the vehicle to navigate safely around the road user.

11. A road user identification system for identifying a road user for safer autonomous road navigation, comprising:
a lidar system generating lidar reflection data representative of a road with the road user on the road;
a computer operably coupled to the lidar system that receives the lidar reflection data;
the computer having a lidar reflection data based classification model with a neural network machine learning algorithm that analyzes the lidar reflection data and determines a first probability value, the first probability value indicating a probability that the road user has a first wearable marker having a distinct reflection characteristic that is associated with a specific type of road user, the first wearable marker being placed on or in an article of clothing of the road user;

the computer storing a road user identifier corresponding to the specific type of road user in a memory device when the first probability value is greater than a threshold probability value; and the computer determining a first position of the road user relative to a vehicle at a first time utilizing the lidar reflection data corresponding to the first digital marker when the first probability value is greater than the threshold probability value.

12. The road user identification system of claim 11, wherein:
the specific type of road user is at least one of a pedestrian, a cyclist, an adult, a child, a senior citizen, and an animal.

13. The road user identification system of claim 11, wherein:
the computer determining a second position of the road user at a second time based on the first position, an estimated initial velocity of the road user, an estimated acceleration of the road user, and a time interval from the first time to the second time; the second time being after the first time; the estimated initial velocity of the road user, the estimated acceleration of the road user, and the time interval being determined based on the road user identifier; and the computer generating control signals based on the second position to induce at least one of a vehicle brake controller, a vehicle powertrain controller, and a vehicle steering controller to control movement of the vehicle such that the vehicle navigates safely around and does not contact the road user.

14. The road user identification system of claim 13, wherein:
the computer having a movement prediction and determination module that determines the estimated initial velocity of the road user, the estimated acceleration of the road user, and the time interval, based on the road user identifier.

15. The road user identification system of claim 13, wherein:
the computer determining a desired trajectory of the vehicle based on the second position of the road user and a position of the vehicle to navigate safely around the road user.

* * * * *